United States Patent [19]

Earleson et al.

[11] Patent Number: 5,041,772
[45] Date of Patent: Aug. 20, 1991

[54] LOCOMOTIVE DYNAMIC BRAKE CONTROL

[75] Inventors: Walter E. Earleson, Peoria; Raymond G. Evans, Washington; Siamak Mirhakimi, Peoria, all of Ill.

[73] Assignee: Caterpillar Inc., Peoria, Ill.

[21] Appl. No.: 578,962

[22] Filed: Sep. 7, 1990

[51] Int. Cl.$^5$ .............................................. H02P 3/00
[52] U.S. Cl. .................................... 318/375; 318/273
[58] Field of Search ......................... 318/362, 365–368, 318/370, 371, 372, 139, 375, 493, 261, 269, 273, 434, 57, 63, 52, 66, 757, 759; 290/14, 40 A, 402

[56] References Cited

U.S. PATENT DOCUMENTS

| | | | |
|---|---|---|---|
| 3,569,811 | 3/1971 | Miller et al. | 318/367 X |
| 4,189,667 | 2/1980 | Boxer | 318/493 X |
| 4,191,914 | 3/1980 | Lecluse | 318/139 |
| 4,498,016 | 2/1985 | Earleson et al. | 290/40 R |
| 4,580,083 | 4/1986 | Omae et al. | 318/274 X |
| 4,677,360 | 6/1987 | Garces | 318/803 |
| 4,730,151 | 3/1988 | Florey et al. | 318/373 X |
| 4,924,395 | 5/1990 | Evans et al. | 318/52 X |
| 4,950,964 | 8/1990 | Evans | 318/52 |

Primary Examiner—William M. Shoop, Jr.
Assistant Examiner—A. Jonathan Wysocki
Attorney, Agent, or Firm—Kirk A. Vander Leest; Stephen L. Noe

[57] ABSTRACT

An apparatus for controlling dynamic braking in a vehicle having at least one drive motor of the type having an armature and a field. The motor is adapted to function as an alternator during dynamic braking for dissipating power through a resistor grid. The vehicle includes a field current controller for regulating the level of dynamic braking by controlling the current level through the motor field. A brake level selector is provided for producing a desired braking level signal. A field current sensor senses the current level in the motor field and produces an actual field current signal. A grid current sensor senses the level of current flowing through the resistor grid and produces an actual grid current signal. A controller receives the desired brake level signal, the actual field current signal, and the actual grid current signal. The controller produces a first desired field current signal and a desired grid current signal in response to the desired brake level signal. The controller further produces a second desired field current signal in response to the actual field current, actual grid current, and desired grid current signals, compares the first and second desired current field and produces a final desired field current signal responsive to the compared signals. The field current through the motor is controlled in response to the final desired field current signal.

8 Claims, 5 Drawing Sheets

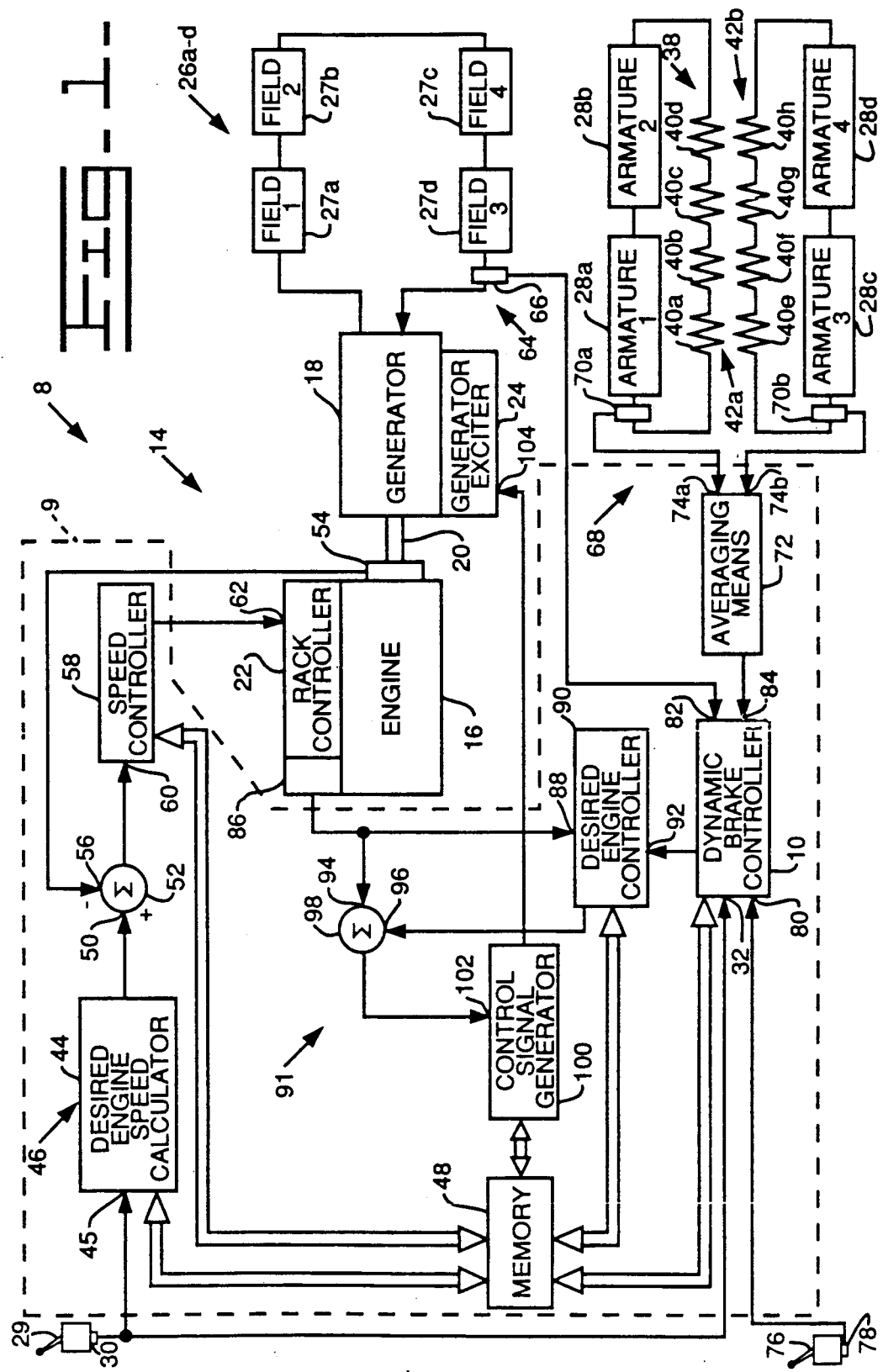

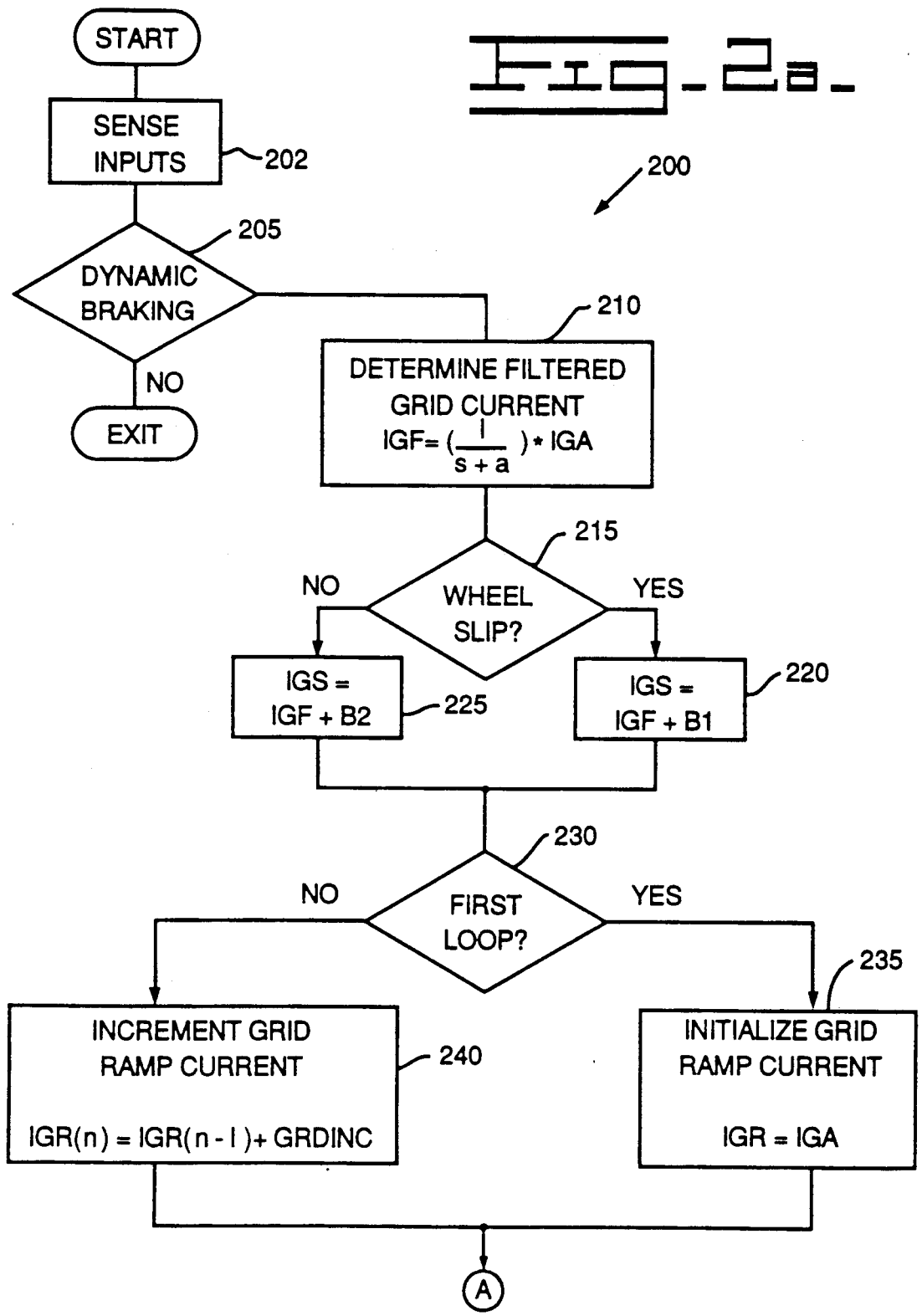
Fig_2a_

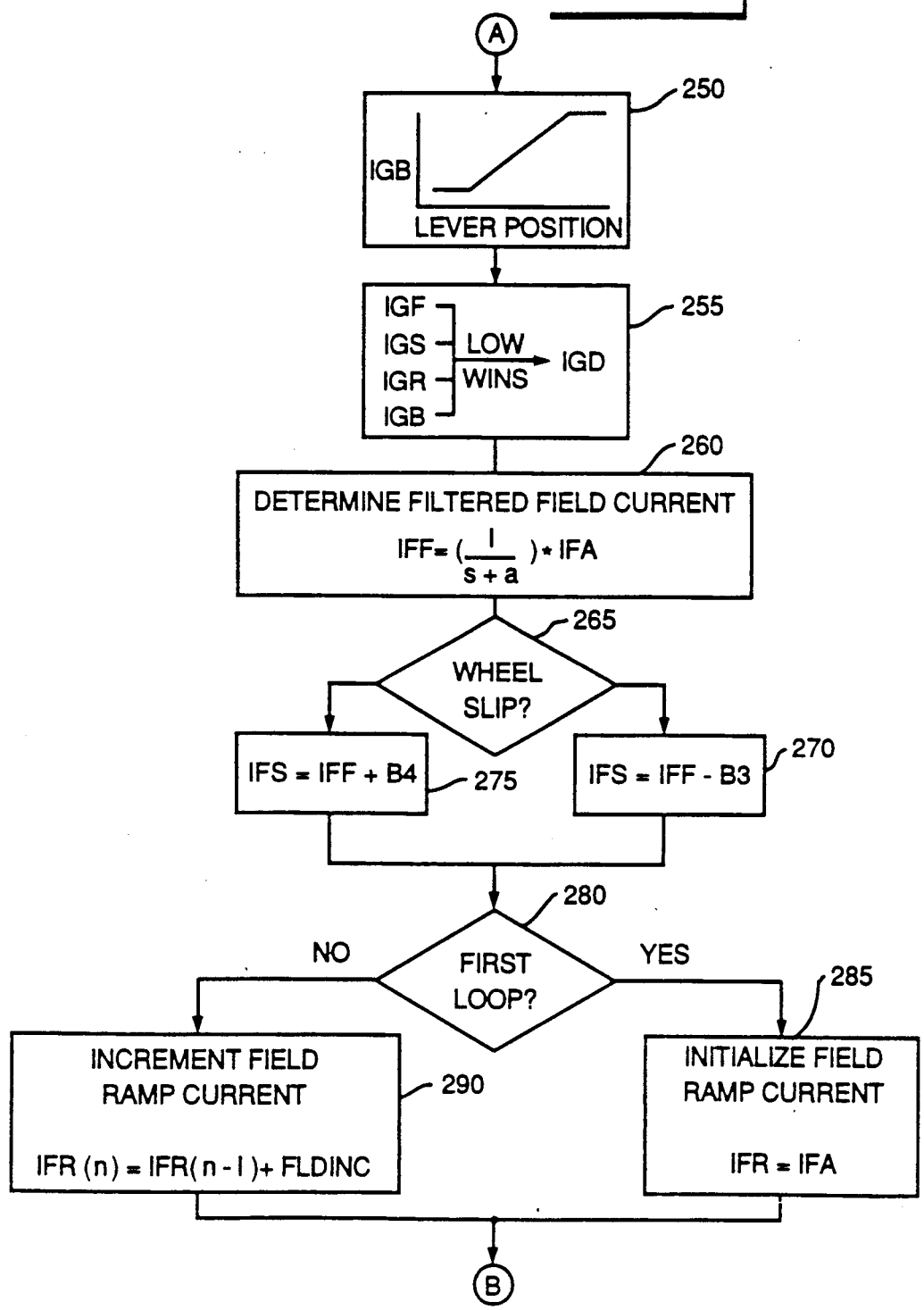

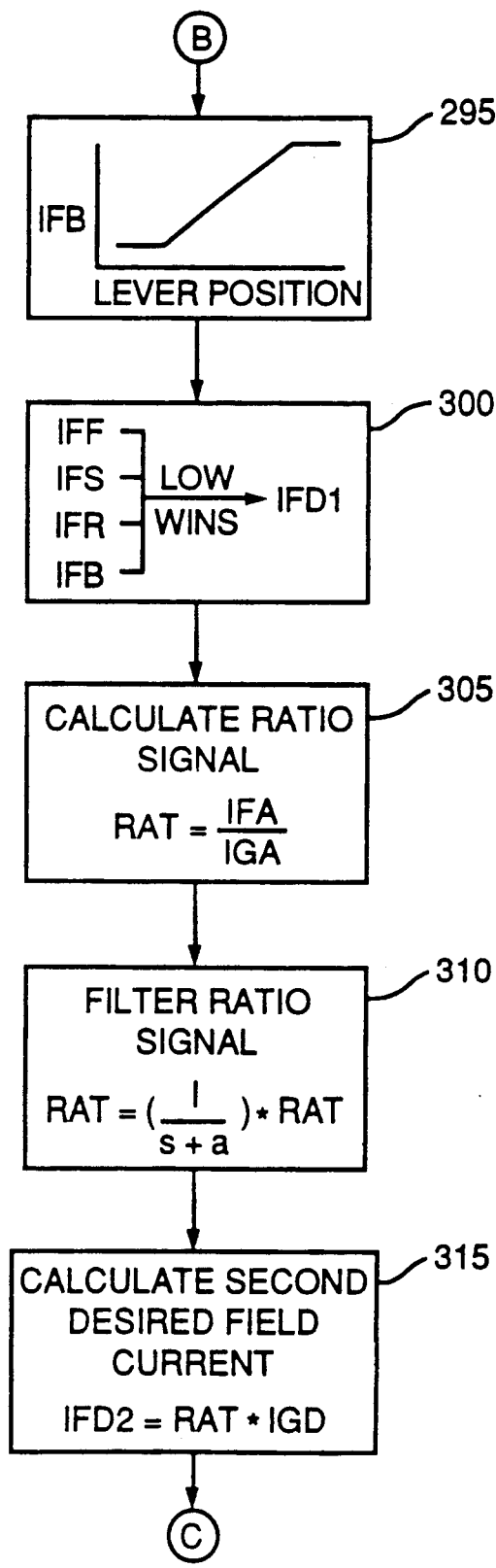

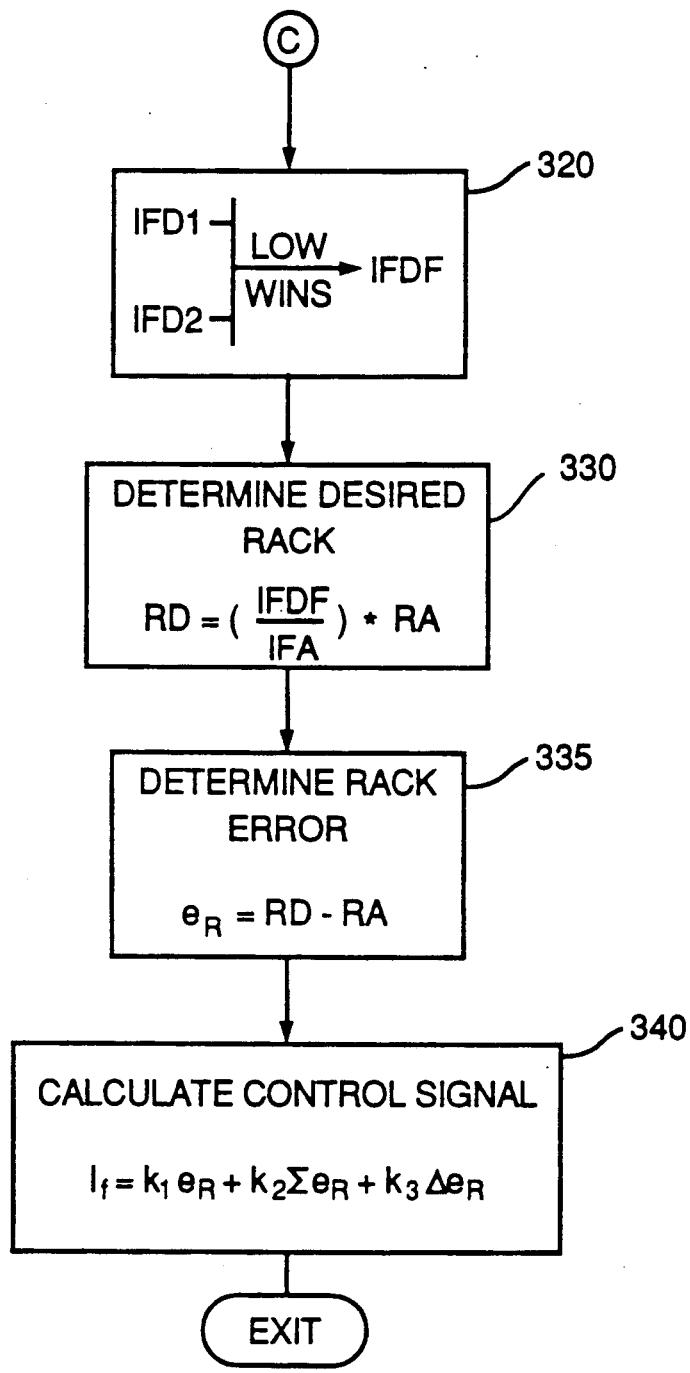
Fig_2d_

LOCOMOTIVE DYNAMIC BRAKE CONTROL

TECHNICAL FIELD

The present invention relates generally to an electronic control for a vehicle and, more particularly, to an electronic dynamic brake controller for a vehicle having at least one electric drive motor which functions as an alternator during dynamic braking to produce a retarding force for slowing the vehicle.

BACKGROUND ART

Dynamic braking systems have been known for some time and offer the advantages of saving wear of friction brake components and also, if the dynamic brake is of the regenerative type, of recovering some of the kinetic energy of the vehicle. A locomotive typically has an engine-generator unit adapted for supplying electrical power to a plurality of traction motors which drive associated drive axles and drive wheels. However, during dynamic braking, the motors are reconfigured to function as alternators for dissipating power through a resistor grid. The power dissipation produces a retarding force which works against the locomotive drive axles thereby slowing the locomotive.

More specifically, during dynamic braking the fields of the drive motors are serially connected to the generator for receiving a current therefrom, hereinafter actual field current. Furthermore, the armatures of the drive motors are electrically connected in series with a resistor grid formed of a plurality of high power resistors and mechanically connected to respective drive axles (not shown) for rotation therewith. The level of current flowing through the resistor grid, hereinafter referred to as actual grid current, is a function of the rotational speed of the armatures and the level of the actual motor field current. The power dissipation in the resistor grid causes a retardation force to act against the turning locomotive wheels, thereby supplementing the locomotive mechanical brakes (not shown). As should be apparent, the amount of power dissipation, and thus the amount of dynamic braking, is a function of the actual grid current.

Most control strategies regulate the level of dynamic braking by operating the engine at a constant speed and controlling the level of exciter current applied to the generator. This in turn controls the current output by the generator and, more specifically, the actual field current. The actual field current controls the magnitude of the actual grid current and thus the level of dynamic braking. However, since the amount of gain between the actual field current and the grid currents is a function of locomotive speed, accurate brake regulation is difficult to achieve.

More specifically, actual field current is related to the generator exciter current by the equation $IFA = k_1 * IE$, where IFA represents the actual field current $k_1$ is a constant and IE represents the exciter current applied to the generator. However, the actual grid current is a function of both locomotive speed and the actual field current. The level of grid current can be expressed with the following equation: $IGA = k_2 * RPM * IFA$, where IGA represents the actual grid current, $k_2$ is a constant, and RPM represents locomotive speed. By substitution, the actual grid current can be expressed as $IGA = k_3 * IE$, where $k_3$ is a constant accounting for conversion factors. As can be seen from the above equations, the actual grid current can be regulated by controlling the generator exciter current. However, the gain between the exciter current and the actual grid current varies with locomotive speed.

Past systems have employed speed sensors to determine locomotive speed and then used the detected speed to calculate the gain between actual field current and actual grid current. The calculated gain in turn is used to determine the generator exciter current required to achieve the desired dynamic braking level. These speed sensors add extra cost to the dynamic brake system and, therefore, the elimination of such sensors is desirable.

The present invention is directed towards addressing the above mentioned problems by providing a dynamic brake controller which automatically adapts to changing locomotive speed without requiring speed sensors. Other aspects, objects and advantages can be obtained from a study of the drawings, the disclosure, and the appended claims.

DISCLOSURE OF THE INVENTION

An apparatus is provided for controlling dynamic braking in a vehicle having at least one drive motor which functions as an alternator during dynamic braking for dissipating power through a resistor grid. The vehicle further includes a field current controller for regulating the level of dynamic braking by controlling the current level through a field of the motor. A brake level selector is provided for producing a desired braking level signal. A field current sensor senses the current level in the motor field and responsively produces an actual field current signal. A grid current sensor senses the level of current flowing through the resistor grid and responsively produces an actual grid current signal. A controller receives the desired brake level, actual field current, and actual grid current signals. The controller produces a first desired field current signal and a desired grid current signal in response to the desired brake level signal. The controller further produces a second desired field current signal in response to the actual field current, actual grid current, and desired grid current signals. The controller compares the first and second desired field current signals and produces a final desired field current signal responsive to the compared signals. The actual field current through the motor is controlled in response to the final desired field current signal in order to regulate the level of dynamic braking.

BRIEF DESCRIPTION OF THE DRAWINGS

FIG. 1 is a simplified block diagram of an electronic locomotive control incorporating an embodiment of the immediate dynamic brake controller; and FIGS. 2A-D are software flowcharts which can be used in programming a microprocessor in accordance with certain aspects of the immediate dynamic brake controller.

BEST MODE FOR CARRYING OUT THE INVENTION

FIG. 1 illustrates an electronic locomotive control 8 which incorporates an embodiment of the immediate dynamic brake controller 10. The locomotive control 8 may be implemented with any suitable hardware including analog or digital circuits which may be either discrete components or integrated. However, in the preferred embodiment, the locomotive control 8 is implemented employing a microprocessor, illustrated generally by the dashed line 9, with appropriated input and output signal conditioning circuits (not shown) as are common in the art. The electronic locomotive control 8 is electrically connected to an engine-generator unit 14 which includes a diesel engine 16 mechanically connected to drive a generator 18 by a drive shaft 20. The engine 16 has a rack controller 22 for controlling the rate of fuel delivery to the engine 16, and the generator 18 includes a generator exciter 24 for controlling the power output therefrom.

During motoring, the engine-generator unit 14 provides electrical power to a plurality of associated dc traction motors 26a–d for driving a plurality of drive axles and drive wheels (not shown). For illustration purposes, four traction motors 26a–d have been shown; however, it should be apparent that the immediate invention is not limited to such a configuration. The motors 26a–d include respective fields 27a–d and armatures 28a–d which are electrically connected to function as alternators during dynamic braking, as shown in FIG. 1. Dynamic braking will be explained in greater detail below. Regulation of the engine-generator unit 14 during motoring is achieved using a conventional microprocessor based locomotive governor control such as the one disclosed in U.S. Pat. No. 4,498,016 which issued on Feb. 5, 1985 to Earleson et al. and is specifically incorporated by reference. The governor control forms no part of the immediate invention and, therefore, it will not be discussed in detail.

A command lever 29 is moveable by a human operator between first and second positions corresponding respectively to motoring and braking. A command lever sensor 30 senses the position of the command lever 29 and produces one of either a braking or motoring signal in response to the sensed lever position. The motoring signal is delivered delivered to the locomotive governor control to enable operation of the governor control.

Similarly, the braking signal is applied to an input terminal 32 of the dynamic brake controller 10 to enable operation of the dynamic brake controller 10. The braking signal is also delivered to a switch means (not shown) causing the motors 26a–d to be electrically reconfigured to function as alternators. The hardware required to achieve this switching operation is well known in the art and, therefore, only a brief functional explanation will be given.

During dynamic braking, the motor fields 27a–d are serially connected to the generator 18 as shown in FIG. 1. The generator 18 produces an alternating current (ac) which is passed through a rectifier (not shown) to produce a dc current level in the motor fields 27a–d, hereinafter referred to as actual field current. The motor armatures 28a–d are mechanically connected to respective drive axles (not shown) for rotation therewith and electrically connected in series with a resistor grid 38 formed of a plurality of high power resistors 40a–h. The resistor grid 38 includes first and second resistor sets 42a, 42b, each of which is serially connected with two motor armatures. It should be understood that the exact configuration of the resistor grid 38 forms no part of the immediate invention and that the dynamic brake controller 10 will work with other configurations, such as one having all the armatures 28a–d serially connected with a single resistor grid.

As previously stated, dynamic braking is controlled by the actual grid current. Furthermore the actual grid current is a function of the rotational speed of the armatures and the actual field current. More particularly, the actual field current is related to the generator exciter current by the equation $IFA = k_1 * IE$, where IFA represents the actual field current, $k_1$ is a constant, and IE represents the generator exciter current. The actual grid current IGA can be expressed by the equation: $IGA = k_2 * RPM * IFA$, where IGA represents the actual grid current, $k_2$ is a constant, and RPM represents locomotive speed. By substitution the actual grid current is related to the exciter current by the equation $IGA = IE * k_3$, where $k_3$ is a constant accounting for conversion factors. Since the relationship between actual field current and actual grid current is a function of speed, some means is required for determining the gain to achieve efficient control of dynamic braking. The present invention accounts for this gain through operation of the dynamic brake controller 10, as explained below.

Continuing with the discussion of FIG. 1, a desired engine speed calculator 44 has an input terminal 45 for receiving the braking signal from the control lever sensor 30. The desired engine speed calculator 44 forms part of an engine governing loop 46 which controls engine speed. During dynamic braking, the engine governing loop 46 is operative for controlling the engine 18 to a preselected speed, such as high idle. More specifically, in response to receiving the braking signal, the desired engine speed calculator 44 accesses a memory unit 48 to determine what speed the engine 18 is to be operated at during dynamic braking. The desired engine speed calculator 44 produces a desired speed signal correlative to the preselected speed stored in the memory unit 48. The desired engine speed signal is applied to an input terminal 50 of a speed summer 52.

A magnetic pick-up sensor 54 is operatively associated with the drive shaft 20 for sensing rotation of the shaft and producing an actual engine speed signal. The actual engine speed signal is applied to a second input terminal 56 of the speed summer 52. The speed summer 52 produces a speed error signal $e_N$ in response to a difference between the actual and desired engine speed signals.

A speed controller 58 has an input terminal 60 for receiving the speed error signal $e_N$ from the speed summer 52. The speed controller 58 accesses a fuel delivery rate formula stored in the memory unit 48 and uses the formula to produce a fuel delivery rate signal as a function of the speed error signal $e_N$. The fuel delivery rate signal is applied to an input terminal 62 of the rack controller 22 to regulate actual engine speed so as to reduce the engine speed error signal $e_N$ to zero.

A field current sensing means 64 is provided for sensing the current level flowing through the motor fields 27a–d and responsively producing an actual field current signal IFA. In the preferred embodiment, the field current sensing means 64 is in the form of a current transformer 66 adapted for sensing the generator output current and responsively producing the actual field current signal IFA.

An grid current sensing means 68 is provided for sensing the level current flowing through the resistor grid 38 and producing an actual grid current signal IGA. More specifically, first and second current sensors 70a,b are adapted to sense the current flowing through the first and second resistor sets 42a,b, respectively, and for producing respective first and second grid current signals. An averaging means 72 has input terminals 74a,b for receiving the first and second grid current signals IGA1,IGA2. The averaging means 72 produces the actual grid current signal IGA in response to the average of the first and second grid current signals IGA1,IGA2. It should be understood that the averaging means could be embodied in either hardware or software; however, in the preferred embodiment, software is utilized to perform this function.

More specifically, the second desired field current signal IFD2 is produced in accordance with the following formula:

$$IFD2 = IGD * \frac{IFA}{IGA}$$

Utilization of this equation negates the requirement for utilizing speed sensors because the ratio of the actual field and grid current signals IFA,IGA is speed dependent. By converting the desired grid current signal IGD into a second desired field current signal IFD2, it is possible to compare the signals to determine which signal should be used to regulate the exciter current IE.

The controller 10 then compares the first and second desired field current signals IFD1,IFD2 and produces a final desired field current signal IFDF in response to the lesser of the compared signals. The final desired field current IFDF signal is used to control the actual field current IFA and thus the level of dynamic braking.

A rack sensor 86 detects actual rack position and produces an actual rack signal RA in response to the detected rack position. The actual rack signal RA is applied to an input terminal 88 of a desired rack calculator 90. The desired rack calculator 90 forms part of a generator control loop 91 which is used to regulate the output current level of the generator 18 and thus actual field current. The desired rack calculator 90 also has an input terminal 92 connected to the dynamic brake controller 10 for receiving a final desired field current signal IFDF which is correlative to the actual field current required to achieve the desired amount of dynamic braking. The desired rack calculator 90 accesses a formula stored in the memory 48 to calculate a desired rack signal RD as a function of the actual rack and final desired field current signals RA,IFDF.

The desired and actual rack signals RA,RD are delivered to first and second input terminals 94,96 of a rack summer 98. The rack summer 98 produces a rack error signal $e_R$ in response to a difference between the actual and desired rack signals. A control signal calculator 100 has an input terminal 102 for receiving the rack error signal $e_R$ from the rack summer 98. The control signal calculator 100 accesses a control signal formula stored in the memory unit 48 and uses the formula to produce a control signal $I_f$ as a function of the rack error $e_R$. The control signal $I_f$ is applied to an input terminal 104 of the generator exciter 24 to regulate the generator output current so as to reduce the rack error signal $e_R$ to zero. As explained above, the level of actual field current controls the actual grid current and thus the level of dynamic braking.

Referring now to FIGS. 2A-D, a software flowchart which can be used in programming the controller 8 in accordance certain aspects of the immediate invention. It should be understood that the functions of the controller can be embodied in a single microprocessor or a plurality of microprocessors for performing specific control functions. The flow chart illustrates a dynamic braking routine 200 which operates to regulate dynamic braking in accordance with the present invention. Initially, in the block 202, inputs signals are read from the various sensor means and variables are stored in the memory unit 48 in accordance with the sensed signals. Next in the block 205, the braking signal is checked to determine if dynamic braking has been requested. If the dynamic braking "on", control is passed to the block 210 where the actual grid current signal IGA is filtered using a software filtering equation to produce a filtered grid current signal IGF. The software filter removes electrical "noise" from the actual grid current signal IGA, as is common in the art.

Thereafter, in the block 215, the controller 8 checks to determine if a wheel slip condition has been detected. The means for detecting wheel slip will not be discussed in detail, as it forms no part of the immediate invention. However, as will be apparent to those skilled in the art, the physical implementation of a wheel slip detector can take a variety of forms including, for example, a comparator for receiving signals from driven and idler wheels or a comparator receiving signals from each of several driven axles. In the preferred embodiment, the wheel slip detector includes both synchronous and differential wheel slip detectors such as those disclosed respectively in U.S. Pat. Nos. 4,924,395 and 4,950,964 which issued on May 8, 1990 and Aug. 21, 1990, respectively, and are specifically incorporated by reference. If wheel slip is detected, control is passed to the block 220 where a grid current slip signal IGS is set equal to the filtered grid current signal IGF less a first predetermined bias B2. Otherwise the grid current slip signal IGS is set equal to the filtered grid current signal IGF plus a second predetermined bias B2 in the block 225.

Control is then passed to the block 230 where it is determined if this is the first execution of the dynamic braking routine 200 since the operator requested dynamic braking. If it is the first loop, control is passed to the block 235 where a grid current ramp signal IGR is initialized to the actual grid current signal IGA. Otherwise, control is passed to the block 240 where the grid ramp current signal IGR is incremented by a preselected amount. More specifically, the present grid ramp current signal IGR(n) is set to the previous grid ramp current signal IGR(n−1) plus a grid ramp increment GRINC. This is done to prevent a desired grid current signal IGD from increasing by more than the grid ramp increment GRINC during an execution loop of the dynamic braking routine 200, as explained below.

Next, in the block 250, a brake selector grid current signal IGB is produced in accordance with the sensed position of the brake level selector 76. More specifically, a lookup table, stored in the memory unit 48, is accessed for producing the brake selector grid current signal IGB in accordance with the magnitude of the desired brake level signal DB. The magnitude of the brake selector grid current signal IGB varies linearly between a minimum and a maximum in accordance with the sensed position of the brake level selector 76.

Control is then passed to the block 255 where a desired grid current is set to the lesser of the filtered grid current signal IGF, the grid current slip signal IGS, the grid current ramp signal IGR, and the brake selector grid current signal IGB. Normally, the desired grid current signal IGD will be incrementally ramped up by the grid current increment GRINC until the grid ramp current signal IGR equals the brake selector grid current signal IGB. However, if wheel slip is detected, the grid current slip signal IGS is provided to limit the desired grid current signal IGD until the wheel slip stops.

Thereafter, control is passed to the block 260 where the actual field current IFA is filtered using a software filtering equation to produce a filtered field current signal IFF. The software filter removes electrical "noise" from the actual field current signal IFA as is common in the art.

Next, control is passed to the block 265 to determine if a wheel slip condition has been detected. If wheel slip has been detected, a field current slip signal IFS is set equal to the filtered field current signal IFF less a third bias B3 in the block 270. Otherwise the field current slip signal IFS is set equal to the filtered field current signal IFF plus a fourth bias B4 in the block 275.

Control is then passed to the block 280 to determine if this is the execution of the dynamic braking routine 200 since the operator requested dynamic braking. If it is, control is passed to the block 285 where a field current ramp signal IFR is initialized at a magnitude equal to the actual field current signal IFA. Otherwise, control is passed to the block 290 where the field ramp current signal IFR is incremented by a preselected amount. More specifically, the present field ramp current signal IFR(n) is set to the previous field ramp current signal IFR(n−1) plus a field ramp increment FRINC. This is done to limit the amount that the desired field current signal IFD can increase during an execution loop of the dynamic braking routine 200.

Next, in the block 295, a brake selector field current signal IFB is produced in accordance with the sensed position of the brake level selector 76. More specifically, a lookup table, stored in the memory unit 48, is accessed for producing the brake selector field current signal IFB in accordance with the magnitude of the desired brake level signal DB. The magnitude of the brake selector field current signal IFB varies linearly between a minimum and a maximum in accordance with the sensed position of the brake level selector 76.

Control is then passed to the block 300 where a first desired field current signal IFD1 is set to the lesser of the filtered field current signal IFF, the field current slip signal IFS, the field current ramp signal IFR, and the brake selector field current signal IFB. Normally, the first desired field current signal IFD1 is incrementally ramped up by the field current increment FRINC until the field ramp current signal IFR equals the brake selector field current signal IFB. However, if wheel slip is detected, the field current slip signal IFS is provided to limit the magnitude of the first desired field current signal IFD1 until the wheel slip stops.

Next in the block 305, a ratio signal RAT is produced in accordance with a ratio of the actual field and actual grid current signals IFA,IGA. More specifically, the ratio signal RAT is produced in accordance with the following equation:

$$RAT = \frac{IFA}{IGA}$$

The ratio signal RAT is then filtered using a software filter to produce a filtered ratio signal RATF. Control is then passed to the block 315 where a second desired field current signal IFD2 is produced in response to a product of the filtered ratio signal RATF and the desired grid current signal IGD. More specifically, the second desired field current signal can be represented by the following equation:

$$IFD2 = IGD \cdot \frac{IFA}{IGA}$$

Utilization of this equation negates the requirement for using speed sensors because the ratio of the actual field and grid current signals IFA,IGA is speed dependent, as set forth above. By converting the desired grid current signal IGD into a second desired field current signal IFD2, it is possible to compare these signals to determine which signal should be used to regulate the generator exciter current.

Thereafter, in the block 320, the first and second desired field current signals IFD1,IFD2 are compared and a final desired field current signal IFDF is set to the lesser of the compared signals. This is done because the actual field and grid currents have upper limits which can not be exceeded without damaging the locomotive's electrical system. These currents kept below the maximums are controlled by limiting the maximum brake lever field and grid current signals IFB,IGB, respectively. However, since the relationship between actual field and grid currents is speed dependent, a given actual field current may or may not cause the maximum actual grid current IGA to be exceeded. Therefore, it is necessary to convert the desired grid current signal IGD into the second desired field current signal IFD2 so that it can be compared to the first desired field current signal IFD1.

Control is then passed to the block 330 where the final desired field current signal IFDF is converted to a desired rack signal RD in accordance with the following equation:

$$RD = \frac{IFDF}{IFA} \cdot RA$$

where RA represents the actual rack signal as produced by the rack position sensor 86. Next in the block 335, a rack error $e_R$ is produced in response to a difference between the desired and actual rack signals RD,RA.

Finally in the block 340, the control signal $I_f$ is calculated using a transfer equation of the PID (proportional, integral, differential) type which is consistent with known control theory. The control signal $I_f$ is applied to the generator exciter 24 for controlling the exciter current IE and thus the level of dynamic braking.

Industrial Applicability

Assume that a locomotive on which the brake controller 10 is installed is initially operating in a motoring condition wherein the motors 26a-d are operative for propelling the locomotive. When an operating condition arises in which it is desirable to use dynamic braking, the operator moves the command lever 29 from the "motoring" to the "braking" position, thereby causing the braking signal to be produced.

The braking signal is delivered to the switch means (not shown) causing the motors 26a-d to be electrically reconfigured to function as alternators. The braking signal is also delivered to the desired engine speed calculator 44 which control the engine to a preselected speed in response to receiving the braking signal.

Upon receiving the braking signal, the dynamic brake controller begins execution of the dynamic braking routine 200. More specifically, the dynamic brake controller 10 produces the first desired field current signal IFD1 and the desired grid current signal IGD in response to the desired brake level signal. The dynamic brake controller 10 further produces the second desired field current signal IFD2 in response to the actual field current, actual grid current, and desired grid current signals IFA,IGA,IGD. The controller 10 the compares the first and second desired current field signals and produces the final desired field current signal in responsive to the lesser of the compared signals.

The generator control loop 91 receives the final desired field current signal IFDF and responsively produces the control signal $I_f$ which is applied to a field current controller 24. The field current controller 24 controls the level of current in the motor fields 27a-d thereby regulating the level of dynamic braking in accordance with the operator's request.

We claim:

1. An apparatus for controlling dynamic braking in a vehicle having at least one drive motor which functions as an alternator during dynamic braking for dissipating power through a resistor grid, said vehicle having a field current controller for regulating the level of dynamic braking by controlling the current level in a field of said motor, comprising:

means for producing a desired braking level signal;

field current sensing means for sensing the current level in said motor field and producing an actual field current signal;

grid current sensing means for sensing the level of current flowing through said resistor grid and producing an actual grid current signal;

controller means for receiving said desired brake level, actual field current, and actual grid current signals, producing a first desired field current signal and a desired grid current signal in response to said desired brake level signal, producing a second desired field current signal in response to said actual field current, actual grid current, and desired grid current signals, comparing said first and second desired current field signals and producing a final desired field current signal responsive to said compared signals; and means for controlling the actual field current through said motor in response to said final desired field current signal.

2. The apparatus as set forth in claim 1 wherein said controller means further produces a ratio signal responsive to a ratio of said actual field and grid current signals and produces said second desired field current signal in response to said ratio and desired grid current signals.

3. The apparatus as set forth in claim 2 wherein said controller means produces said second desired field current signal in response to a product of said ratio and desired grid current signals.

4. The apparatus as set forth in claim 3 wherein said final desired field current signal is produced in response to the lesser of said first and second desired field current signals.

5. In a vehicle having at least one drive motor which functions as a alternator during dynamic braking for dissipating power through a resistor grid, said vehicle having a field current controller for controlling the level of dynamic braking by regulating the current level in a field of said motor, a method for controlling dynamic braking comprising;

sensing a desired braking level and producing a first desired field current signal and a desired grid current signal in response to said sensed braking level;

sensing an actual field current in said motor and responsively producing an actual field current signal;

sensing the current level in said resistor grid and responsively producing an actual grid current signal;

producing a second desired field current signal in response to said actual field current, actual grid current, and desired grid current signals;

comparing said first and second desired current signals and producing a final desired current signal responsive to said compared signals; and controlling the field current applied to said motor in response to said final desired current signal.

6. The method as set forth in claim 5 further includes the steps of:

producing a ratio signal responsive to a ratio of said actual field and grid current signals; and producing said second desired field current signal in response to said ratio and desired grid current signals.

7. The method as set forth in claim 6 wherein said desired field current signal is produced in response to a product of said ratio and desired grid current signals.

8. The method as set forth in claim 7 wherein said final desired field current signal is produced in response to the lesser of said first and second desired field current signals.

* * * * *